D. L. CLARK & W. C. GILLIS.
PACKAGE COATING MACHINE.
APPLICATION FILED MAY 5, 1909.

950,369.

Patented Feb. 22, 1910.
3 SHEETS—SHEET 1.

WITNESSES.

INVENTORS

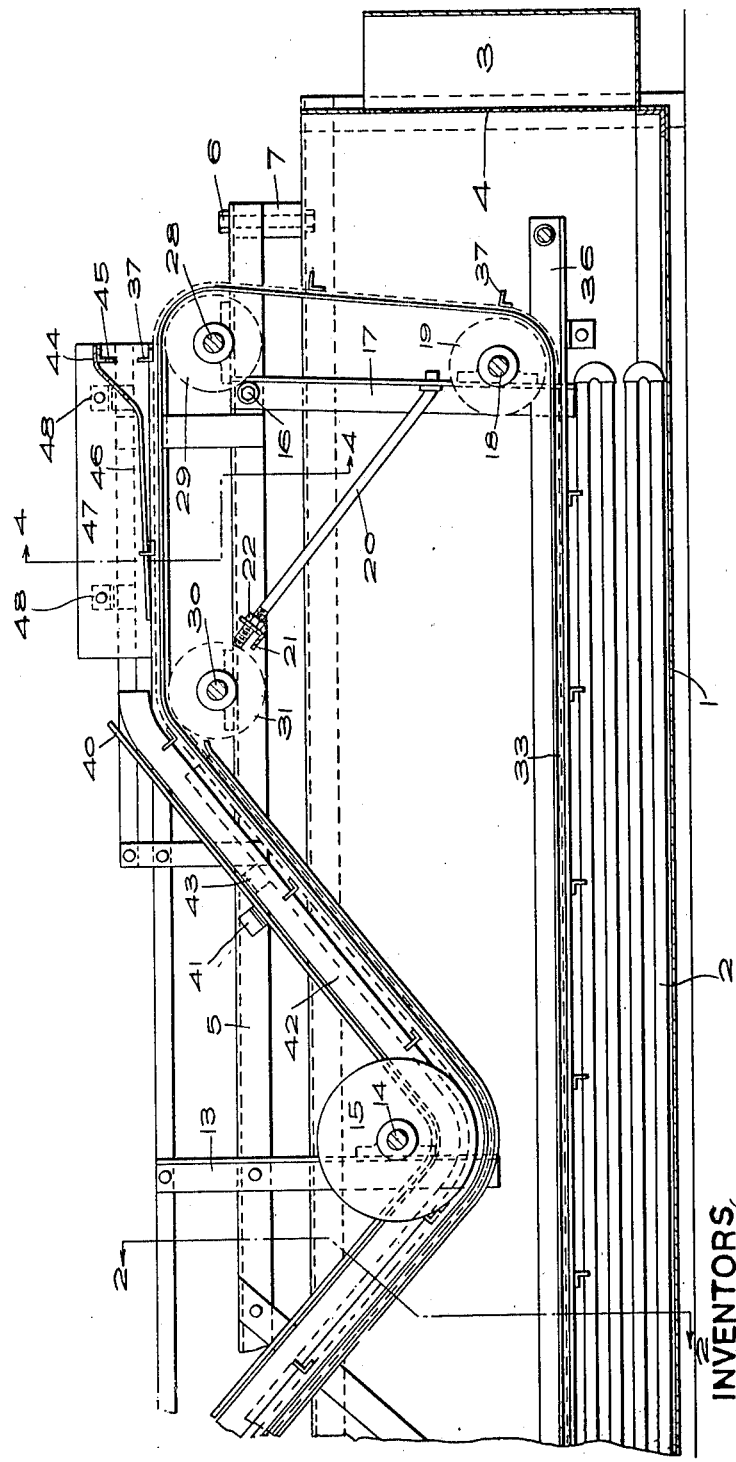

D. L. CLARK & W. C. GILLIS.
PACKAGE COATING MACHINE.
APPLICATION FILED MAY 5, 1909.

950,369.

Patented Feb. 22, 1910.
3 SHEETS—SHEET 3.

WITNESSES

INVENTORS
David L. Clark and
William C. Gillis.
By Fredk W. Winter
Attorney

UNITED STATES PATENT OFFICE.

DAVID L. CLARK, OF VERSAILLES TOWNSHIP, ALLEGHENY COUNTY, AND WILLIAM C. GILLIS, OF EAST McKEESPORT, PENNSYLVANIA.

PACKAGE-COATING MACHINE.

950,369.  Specification of Letters Patent.  Patented Feb. 22, 1910.

Application filed May 5, 1909. Serial No. 494,126.

*To all whom it may concern:*

Be it known that we, DAVID L. CLARK and WILLIAM C. GILLIS, residents of Versailles township and East McKeesport, in the county of Allegheny and State of Pennsylvania, have invented a new and useful Improvement in Package-Coating Machines, of which the following is a specification.

This invention relates to coating apparatus, such as for coating packages and other articles with melted paraffin, oils, waxes, lacquer, and other coating material.

The object of the invention is to provide apparatus for this purpose whereby packages and other articles may be quickly, uniformly and thoroughly coated with a thin layer of coating material, and which is so constructed that the parts can be readily cleaned.

The invention comprises the construction and arrangement of parts hereinafter described and claimed.

Figure 1:
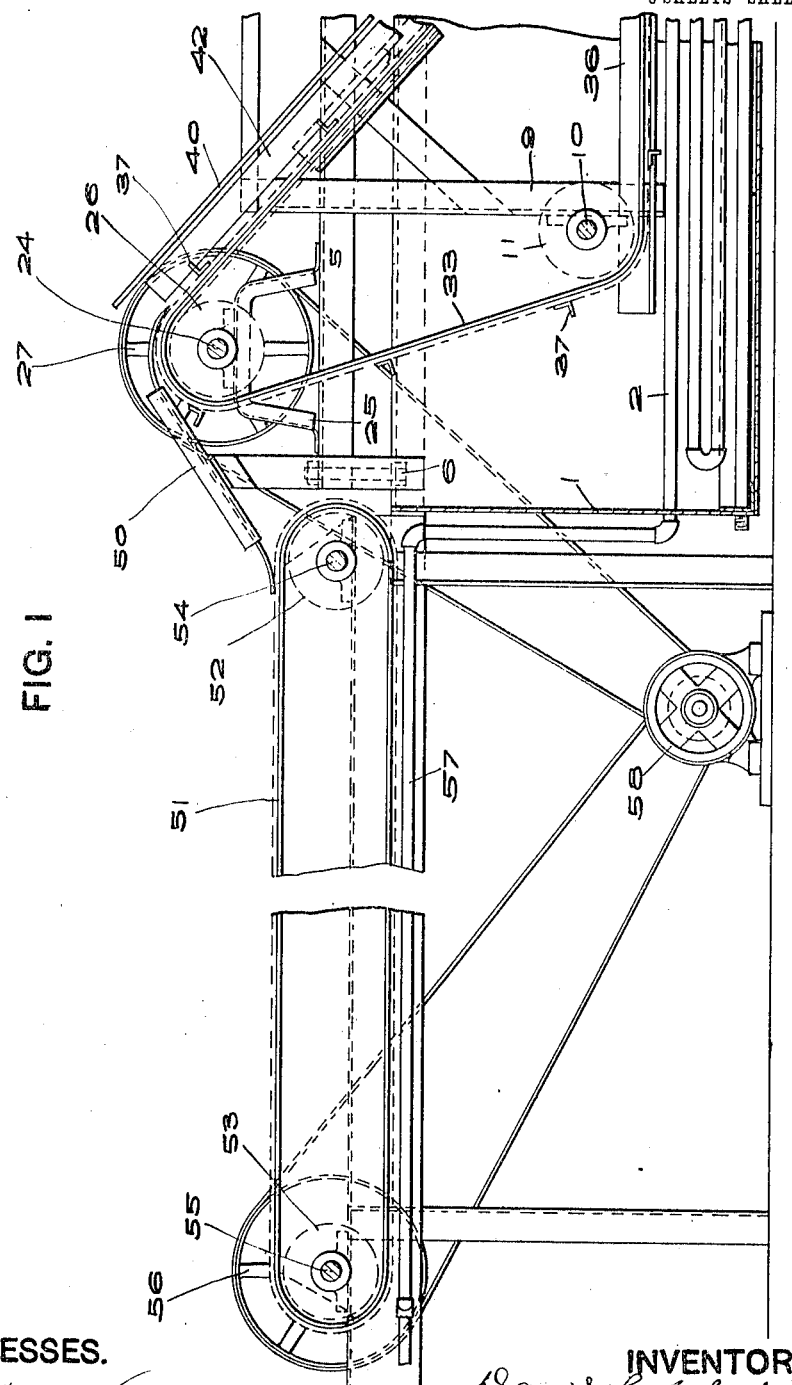
Figure 4:
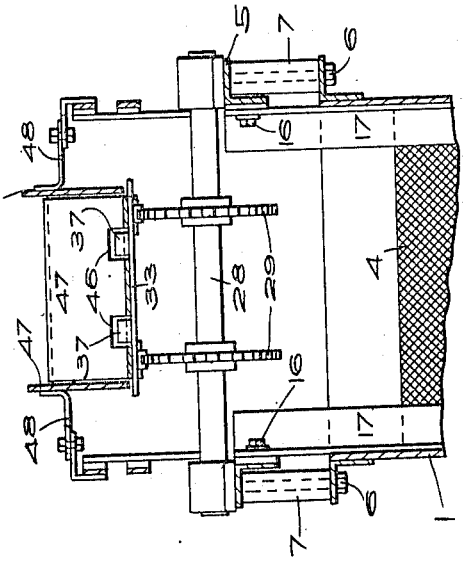
Figure 3:
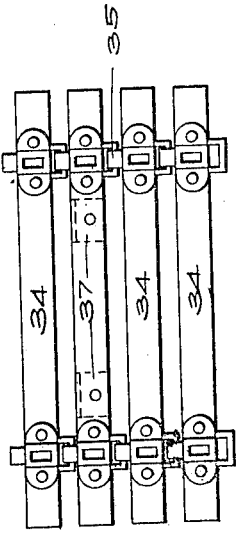
Figure 2:
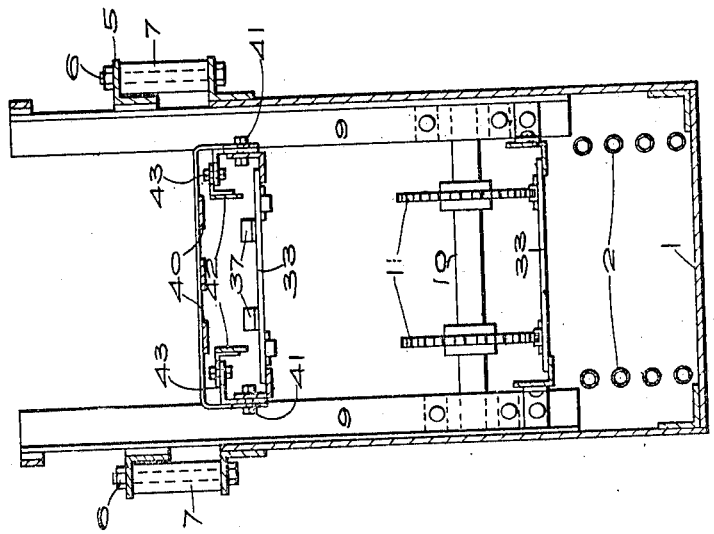

In the accompanying drawings Figures 1 and 1ª illustrate a central vertical section through the apparatus; Fig. 2 is a vertical transverse section on the line 2—2, Fig. 1ª; Fig. 3 is a plan view of a portion of the conveyer; and Fig. 4 is a detail section on the line 4—4, Fig. 1ª.

The apparatus comprises a suitable tank 1 in which the coating material is placed. When the coating material is paraffin or other suitable substance which is solid when cold, a suitable heater is provided for maintaining the paraffin in molten condition, this heater being shown as steam coils 2 located in the bottom of the tank. At one end the tank is open and communicates with a reservoir 3 which is open at its upper end for receiving cakes of paraffin to maintain the supply in the tank, said cakes gradually melting and flowing into the tank. A screen 4 separates the reservoir from the tank to prevent lumps of paraffin from entering the tank. A frame 5 comprising side and cross members is detachably secured to the top of the tank, such as by means of bolts 6 extending through the frame at its corners and through spacing members 7 and through the top member of the tank. This frame is provided at one end with braced legs 9 which project downwardly into the tank and at their lower ends carry boxes for a shaft 10 upon which are secured a pair of guide wheels 11. Projecting from the middle part of the frame are similar legs 13 carrying boxes for a shaft 14 carrying guide wheels 15. Pivotally secured at 16 to the opposite end of the frame are a pair of downwardly projecting legs 17 carrying boxes in which is mounted a shaft 18 carrying guide wheels 19. The legs 17 have connected thereto diagonal brace members 20 which at their upper ends are passed through openings in brackets 21 secured to the frame and being threaded and provided with adjusting nuts 22 as shown. A shaft 24 is mounted in bearings carried by brackets 25 secured directly to one end of frame 5. This shaft carries a pair of sprocket or similar wheels 26 and is provided with suitable driving means, such as a belt pulley 27. At the opposite end of the frame is mounted a shaft 28 carrying guide wheels 29, and adjacent to said end is mounted another shaft 30 carrying guide wheels 31.

An endless carrier for the packages or articles to be coated is shown at 33, this being of the construction shown in Fig. 3 having slats 34 connected by the link members 35, said link members forming practically a sprocket chain and being engaged by the driving sprockets 26 for imparting movement to the carrier. This carrier passes over driving sprockets 26, thence underneath guide wheels 11 and 19, thence up over guide wheels 29 and 31 and thence downwardly underneath guide wheels 15 and back over sprocket wheels 26, as will be readily understood. The lower reach of the conveyer is supported by angle bars 36, upon which the ends of the slats slide as the conveyer moves. The conveyer is kept taut by adjusting the nuts 22 on braces 20, as will be readily understood. This conveyer is provided with projecting fingers or lugs 37 to engage the packages or other articles to be coated and carry the same along with the conveyer. The depressed portion of the upper reach of said conveyer dips down into the melted coating material in the tank, and said carrier therefor carries the packages or other articles down through the coating material and thence up out of the same.

To prevent the articles from escaping from the carrier when the same strike the coating material and to cause the articles to be submerged, suitable guides 40 are provided above the submerged portion of the carrier and serving to hold the packages or other articles from rising. These guides are vertically adjustable by a slot and bolt connection 41 with the frame 5 in order to accommodate articles of different thicknesses. Suitable side guides 42 are also provided to prevent the packages from escaping sidewise, and these are also adjustable toward and from each other, as indicated at 43, to accommodate articles of various lengths.

Over the horizontal portion of the carrier at the receiving end of the machine is provided a hopper in which the packages or other articles to be coated are placed. This hopper has a bottom 44 which inclines upwardly toward the receiving end and is supported at said end as at 45 while its opposite end rests on the conveyer. Said bottom is slotted, as at 46, to allow the passage of the fingers or lugs 37 on the conveyer, so that said fingers or lugs may engage the packages or other articles contained in the hopper. The sides 47 of the hopper are connected to the frame 5 by lugs 48 which are slotted to permit the sides to be adjusted toward and from each other.

At the delivery end of the tank is a suitable inclined chute 50 upon which the articles are delivered and down which they slide to a slatted endless conveyer 51 passing over wheels 52 and 53 on shafts 54 and 55 respectively, one of which shafts is provided with suitable driving means, such as belt pulley 56. Underneath this conveyer is a heating coil 57 which will maintain coating material such as paraffin in a fluid condition so that the excess will drip off, or with other kinds of coating material will serve as a drier. The two endless conveyers can be driven by any suitable mechanism, the drawings showing the pulleys 27 and 56 belted up to a motor 58, but obviously this can be varied within wide limits.

The operation of the apparatus will be readily understood from the foregoing description. It is designed particularly for applying a paraffin coating to packages which must be hermetically sealed, such as packages of popcorn or other confections, cereals, biscuits, tobacco, etc. By means of it such packages can be coated quickly and in large quantities and in a manner to insure a thin, uniform and unbroken coating of paraffin or other coating material so as to hermetically seal the same. The apparatus may be used for other purposes.

It will be observed that the frame carrying the endless conveyer, its guiding and driving wheels, and the guides therefor, is detachably secured to the tank, and can be bodily removed therefrom so as to permit free access to the tank for purposes of cleaning or the like, and without in any manner disarranging the conveyer or its guiding and driving mechanism. The heating coils 2 are arranged vertically at the sides of the tank, so as not to interfere with the cleaning of the bottom of the tank when the frame is removed.

What we claim is:

1. Coating apparatus comprising a tank, an endless flexible carrier having the ends of its upper reach guided above the tank and an intermediate portion dipping down into the tank, means for driving said carrier, and guides above the depressed portion of said carrier to engage the articles and hold the same on said carrier.

2. Coating apparatus comprising a tank, an endless flexible carrier having the ends of its upper reach guided above the tank and an intermediate portion dipping down into the tank, means for driving said carrier, vertically adjustable guides above the depressed portion of said carrier and arranged to engage the articles and hold the same on said carrier, and laterally adjustable guides between which the articles are carried.

3. Coating apparatus comprising a tank, an endless carrier having the ends of one of its reaches guided above the tank and the intermediate portion thereof dipping down into the tank, guides above the depressed portion of the carrier arranged to engage the articles, and guides at the sides also arranged to engage the articles and prevent them from leaving the carrier.

4. Coating apparatus comprising a tank, an endless carrier having the ends of its upper reach guided above the tank and an intermediate portion arranged to dip down into the tank and carry the articles through the latter, laterally adjustable guides arranged to engage the ends of the articles, and other guides arranged to engage the articles and hold them from rising from the carrier.

5. Coating apparatus comprising a tank, an endless carrier having a portion guided to dip down into the tank and carry the articles therethrough, guides above the carrier arranged to hold the articles on the same, a conveyer located at the delivery end of said tank, a heater in said tank, and a heater underneath the delivery conveyer.

6. Coating apparatus comprising a tank, an endless carrier arranged to dip down into the tank and carry articles therethrough, guides above that portion of the carrier extending down into the tank, a heater in the tank, and a supply reservoir for coating material at one end of the tank and separated therefrom by a screen.

7. Coating apparatus comprising a tank, a frame detachably secured thereto and having portions projecting down into the tank, an endless carrier, and guiding and driving wheels for said endless carrier mounted on said frame and removable therewith and arranged to guide the lower reach of the carrier through the tank and a portion of the upper reach down into the tank.

8. Coating apparatus comprising a tank, a frame detachably secured thereto and provided at the ends and intermediate the ends, with members projecting downwardly into the tank, guiding and driving wheels mounted on said frame and removable therewith and arranged to guide the lower reach of the conveyer through the tank and to depress a portion of the upper reach down into the tank, and guides arranged above the depressed portion of the upper reach of said conveyer.

9. Coating apparatus comprising a tank, a frame detachably secured to the tank and located above the same, driving and guide wheels for an endless conveyer mounted in said frame above the tank, downwardly projecting portions on the frame at the ends, guide wheels for the conveyer mounted in said downwardly projecting portions and guiding the lower reach of the conveyer, a downwardly projecting portion at the middle of the frame, guide wheels mounted in said last named portion and guiding the upper reach of the conveyer down into the tank, and guides above the depressed portion of the upper reach of said conveyer.

10. Coating apparatus comprising a tank, an endless carrier having the ends of one of its reaches guided above the tank and the intermediate portion thereof dipping down into the tank, guides above the depressed portion of said carrier, and a hopper at one end of said carrier arranged to deliver articles thereto, said hopper having a bottom supported at one end and the other end resting on the carrier.

11. Coating apparatus comprising a tank, an endless carrier having the ends of one of its reaches guided above the tank and the intermediate portion thereof dipping down into the tank, guides above the depressed portion of said carrier, and a hopper at one end of said carrier arranged to deliver articles thereto, said hopper having a bottom curved upwardly at one end and supported at said end and with the other end resting on the carrier and slotted longitudinally for the passage of lugs on the carrier.

In testimony whereof, we have hereunto set our hands.

DAVID L. CLARK.
WILLIAM C. GILLIS.

Witnesses:
SCOTT M. STEWART,
R. H. HICKMAN.